United States Patent
Krobot

(10) Patent No.: US 8,251,178 B2
(45) Date of Patent: Aug. 28, 2012

(54) LINKAGE-DRIVEN POWER STEP

(75) Inventor: Borivoj Krobot, La Porte, IN (US)

(73) Assignee: Actuant Corporation, Menomonee Falls, WI (US)

( * ) Notice: Subject to any disclaimer, the term of this patent is extended or adjusted under 35 U.S.C. 154(b) by 408 days.

(21) Appl. No.: 12/551,650

(22) Filed: Sep. 1, 2009

(65) Prior Publication Data

US 2010/0051387 A1    Mar. 4, 2010

Related U.S. Application Data

(60) Provisional application No. 61/093,513, filed on Sep. 2, 2008.

(51) Int. Cl.
*E06C 5/00*    (2006.01)

(52) U.S. Cl. ............... 182/88; 182/127; 182/96

(58) Field of Classification Search .......... 182/127, 182/88, 89, 85, 95; 280/166
See application file for complete search history.

(56) References Cited

U.S. PATENT DOCUMENTS

| | | | |
|---|---|---|---|
| 1,189,595 A | 7/1916 | McCarthy et al. | |
| 1,242,828 A * | 10/1917 | Lyle .................... | 105/448 |
| 2,852,271 A | 9/1958 | McDonald | |
| 3,095,216 A | 6/1963 | Browne et al. | |
| 3,645,557 A | 2/1972 | Aldropp et al. | |
| 3,807,757 A | 4/1974 | Carpenter et al. | |
| 3,834,490 A | 9/1974 | Ford | |
| 3,853,369 A | 12/1974 | Holden | |
| 4,108,457 A | 8/1978 | Garrett | |
| 4,110,673 A | 8/1978 | Magy et al. | |
| 4,116,457 A | 9/1978 | Nerem et al. | |
| 4,180,143 A | 12/1979 | Clugston | |
| 4,623,160 A | 11/1986 | Trudell | |
| 4,720,116 A | 1/1988 | Williams et al. | |
| 5,085,450 A | 2/1992 | DeHart, Sr. | |
| 5,498,012 A | 3/1996 | McDaniel et al. | |
| 5,505,476 A | 4/1996 | Maccabee | |
| 5,538,269 A | 7/1996 | McDaniel et al. | |
| 5,547,040 A | 8/1996 | Hanser et al. | |
| 5,842,709 A | 12/1998 | Maccabee | |
| 5,957,237 A | 9/1999 | Tigner | |
| 6,082,751 A | 7/2000 | Hanes et al. | |
| 6,213,486 B1 | 4/2001 | Kunz et al. | |
| 6,655,706 B1 | 12/2003 | Murrell | |
| 6,659,224 B2 | 12/2003 | Medsker | |
| 6,942,233 B2 | 9/2005 | Leitner et al. | |
| 7,377,531 B2 | 5/2008 | Fabiano et al. | |
| 7,413,204 B2 | 8/2008 | Leitner | |
| 7,513,520 B2 | 4/2009 | Okuyama | |
| 2008/0157500 A1 * | 7/2008 | Raley et al. .......... | 280/166 |
| 2009/0189365 A1 | 7/2009 | Ferguson et al. | |

* cited by examiner

*Primary Examiner* — Alvin Chin Shue
*Assistant Examiner* — Daniel Cahn
(74) *Attorney, Agent, or Firm* — Quarles & Brady LLP

(57) ABSTRACT

A movable step apparatus that includes a mounting frame, at least one step, and a rotary drive mechanism is provided. The movable step apparatus also includes a drive link and a follower link. The drive link is operatively connected to the drive mechanism to move the at least one step between retracted and extended positions. The follower link is pivotally connected to the drive link and pivotally connected to the at least one step. The follower link drives the at least one step to extend and retract the at least one step. The movable step apparatus further includes at least one link pivotally connecting the at least one step to the mounting frame to move between the retracted and extended positions.

20 Claims, 5 Drawing Sheets

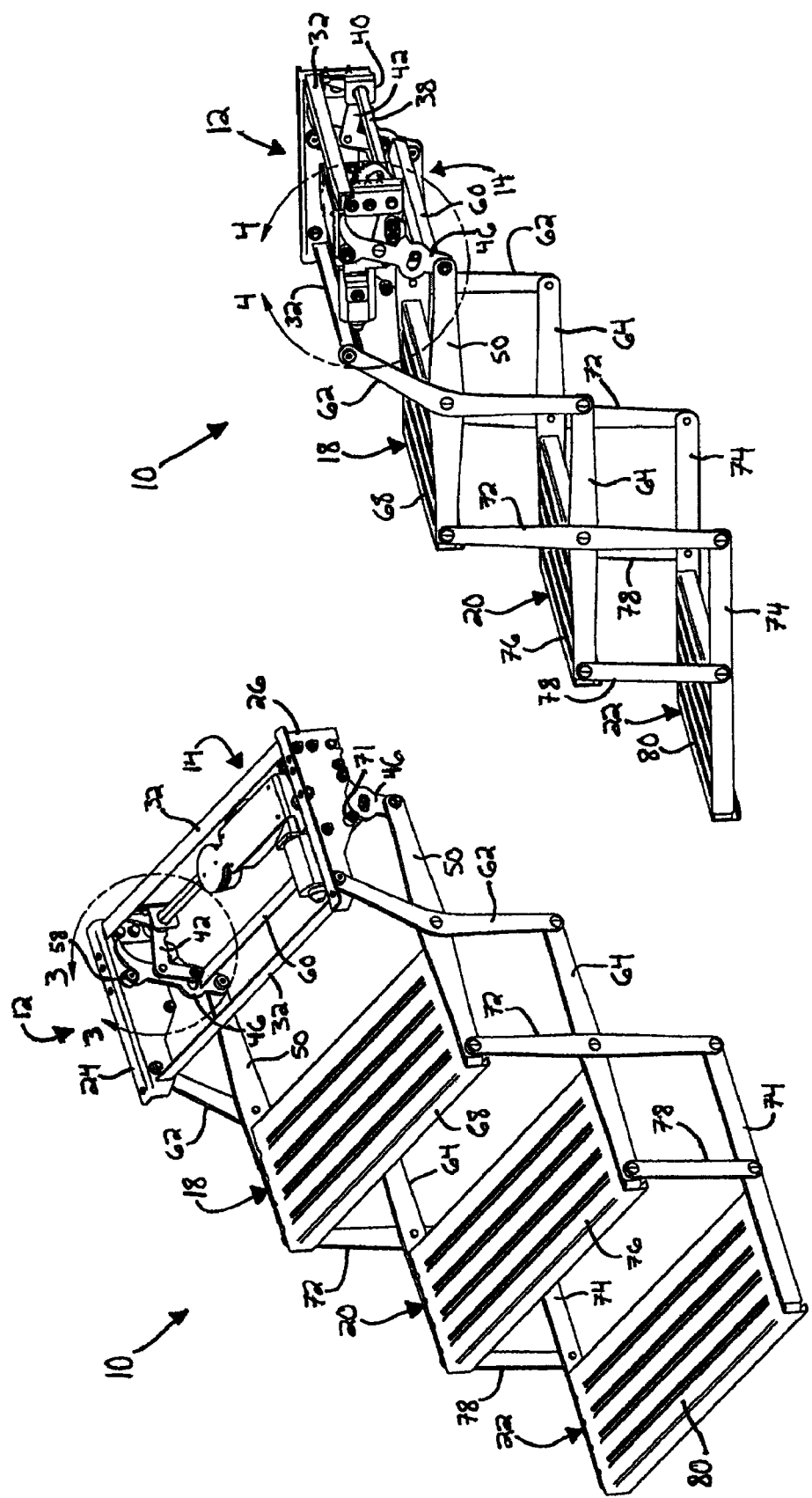

LINKAGE-DRIVEN POWER STEP

CROSS-REFERENCE TO RELATED APPLICATION

This claims the benefit of U.S. Provisional Patent Application No. 61/093,513 filed Sep. 2, 2008, which is hereby incorporated by reference for all purposes.

STATEMENT REGARDING FEDERALLY SPONSORED RESEARCH OR DEVELOPMENT

Not applicable.

FIELD OF THE INVENTION

The invention relates generally to a movable step apparatus for a recreational vehicle that moves between extended and retracted positions.

BACKGROUND OF THE INVENTION

Automatic step systems for recreational vehicles, motor homes, and the like are well known in the art. These systems are typically electrically-controlled and electrically-actuated to extend and retract an entryway step in response to a signal provided by an individual wishing to enter or exit the vehicle. One common system extends the step when the vehicle door is opened, and then retracts the step when the vehicle door is closed. Other systems offer a switch located just inside the vehicle door that controls extension and retraction of the step.

Other systems incorporate a motor assembly for automatically extending and retracting the step assembly. The motor rotates a pivot rod through a gear assembly that is coupled to the rod. The pivot rod moves a linkage assembly to extend and retract the steps. However, an applied load tends to move the steps towards the retracted position. Generally, the motor assembly is used to resist the tendency of the steps to move towards the retracted position. This may limit the service life of components in the motor assembly. Other types of systems use solid stops that contact one or more of the links to resist applied loads instead of the motor assembly. However, the links do not positively lock against the solid stops. Therefore, an improved mechanism for extending and retracting steps in recreational vehicles is needed.

SUMMARY OF THE INVENTION

The present invention provides a movable step apparatus that includes a mounting frame, at least one step, and a rotary drive mechanism. The movable step apparatus also includes a drive link and a follower link. The drive link is operatively connected to the drive mechanism to move the at least one step between retracted and extended positions. The follower link is pivotally connected to the drive link and pivotally connected to the at least one step. The follower link drives the at least one step to extend and retract the at least one step. The movable step apparatus further includes at least one link pivotally connecting the at least one step to the mounting frame to move between the retracted and extended positions.

The follower link may include a slot that provides stops to rotation of the drive link relative to the follower link, and the drive link may include a pin that extends into the slot of the follower link. The follower link may further include a free end with a guide surface and a locking surface, and the mounting frame may include a stop that cams against the guide surface as the step approaches the extended position. The stop may come to rest received on the locking surface in the extended position.

The foregoing and other objects and advantages of the invention will appear in the detailed description that follows. In the description, reference is made to the accompanying drawings that illustrate a preferred embodiment of the invention.

BRIEF DESCRIPTION OF THE DRAWINGS

FIG. 1 is a perspective view of a movable step apparatus of the invention in an extended position;

FIG. 2 is a perspective view of the movable step apparatus of FIG. 1 in the extended position with a mounting bracket removed to illustrate a drive link and a follower link;

DETAILED DESCRIPTION OF THE PREFERRED EMBODIMENT

Figure 4:
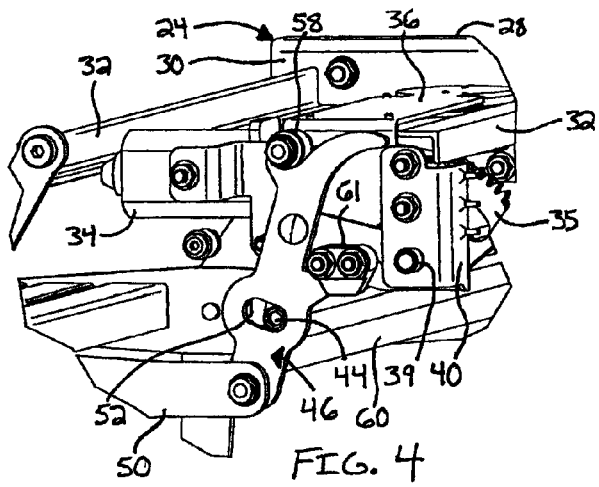
FIG. 4 is a detail view of the area defined by line 4-4 of FIG. 2.
Figure 5:
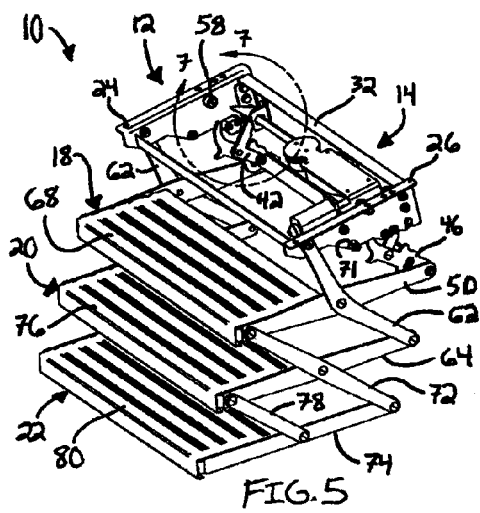
FIG. 5 is a perspective view of the movable step apparatus of FIG. 1 moving between the extended position and a retracted position.
Figure 6:
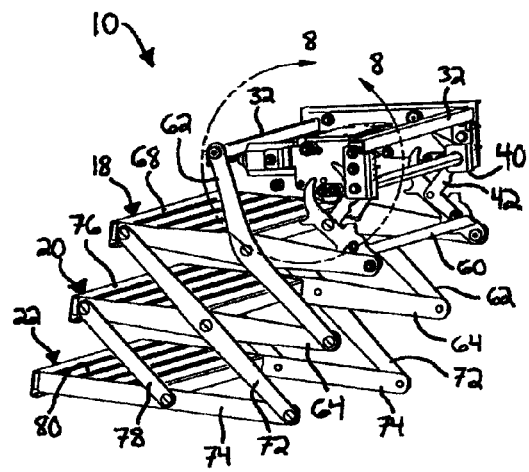
FIG. 6 is a perspective view of the movable step apparatus of FIG. 1 moving between the extended and retracted positions with a mounting bracket removed to illustrate the drive link and the follower link.
Figure 9:
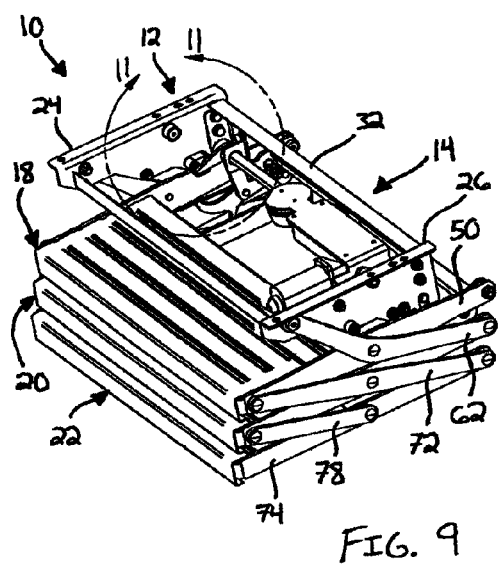
FIG. 9 is a perspective view of the movable step apparatus of FIG. 1 in the retracted position.

Referring to FIGS. 1, 5, and 9, a movable step apparatus 10 of the present invention includes a mounting frame 12 to which a rotary drive mechanism 14 is connected. The movable step apparatus 10 also pivotally connects to a linkage assembly and preferably an upper step 18, a middle step 20, and a lower step 22. The rotary drive mechanism 14 drivingly engages the linkage assembly to move the step apparatus 10 between an extended position (FIG. 1-4) and a retracted position (FIGS. 9-12).

Figure 3:
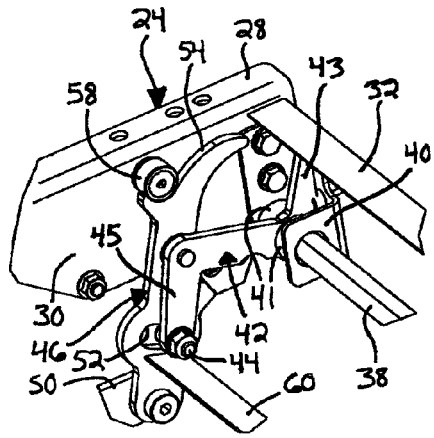
FIG. 3 is a detail view of the area defined by line 3-3 of FIG. 1.

The mounting frame 12 includes two mounting brackets 24 and 26 and two connecting members 32 that connect the mounting brackets 24 and 26. It should be understood that the mounting bracket 26 is not shown in some figures so that other components can be seen. Referring to FIGS. 3 and 4, the mounting brackets 24 and 26 each include an upper section 28 and a lower section 30. The upper sections 28 permit the mounting brackets 24 and 26 to be attached to a vehicle, and therefore preferably include fastener holes as shown in the figures. Alternatively, the upper sections 28 may be attached to a vehicle by other means, such as welding and the like. The upper sections 28 are preferably in a horizontal plane relative to the vehicle when attached to the vehicle. The lower sections 30 are generally perpendicular to the upper sections 28 and attach to other components of the step apparatus 10 as discussed below.

Referring to FIGS. 1-12, the rotary drive mechanism 14 is located between the mounting brackets 24 and 26 of the mounting frame 12. The rotary drive mechanism 14 may be a worm gear drive such as those used for moving automobile windows. As such, the rotary drive mechanism 14 may include a drive motor 34 that drives a transmission 36. The transmission 36 may include, for example, a section gear 35 (FIGS. 4 and 8) that is coupled to a drive shaft 38 that preferably has a square cross section. The drive shaft 38 may have other cross sectional shapes, such as a hexagon, provided that the drive shaft 38 is capable of driving the plurality of links. The drive shaft 38 connects to the mounting brackets 24 and 26 by bearings 39 and brackets 40 (FIG. 4) that are fixed to the mounting brackets 24 and 26. The brackets 40 are preferably fixed to the mounting brackets 24 and 26 by standard fasteners, and the bracket 40 near the transmission 36 may be integral with the transmission 36. The drive motor 34 may also be fixed to the mounting bracket 26 and part of the transmission 36, for example, by a standard fastener. The drive shaft 38 also accommodates spacers 41 (FIG. 3) proximate the brackets 40 for positioning of the linkage assembly. The brackets 40 preferably include soft stops 37 (FIGS. 7 and 11) to engage the linkage assembly as discussed below. The soft stops 37 may be, for example, rubber stops or the like.

The linkage assembly includes a plurality of links and connects to the drive shaft 38 between the spacers 41. Specifically, drive links 42 of the linkage assembly connect to the drive shaft 38. The drive links 42 are located at each end of the drive shaft 38 and are generally identical. In addition, each link of the linkage assembly has a generally identical link on the opposite ends of the step apparatus 10 and, therefore, only the links on a single side of the apparatus 10 will be described here in detail. The drive link 42 preferably has a double dog-legged shape and includes a square hole (not shown) to connect to the drive shaft 38. The drive link 42 includes a proximal leg 43 (FIGS. 3, 7, and 11) that engages the soft stops 37 as discussed below. The drive link 42 also includes a distal leg 45 that preferably pivotally connects to a follower link 46. The end of the distal leg 45 preferably includes a pin 44. The pin 44 may be a bolt or any other type of fastener that can be accommodated in a slot on the follower link 46 as discussed below.

Figure 7:
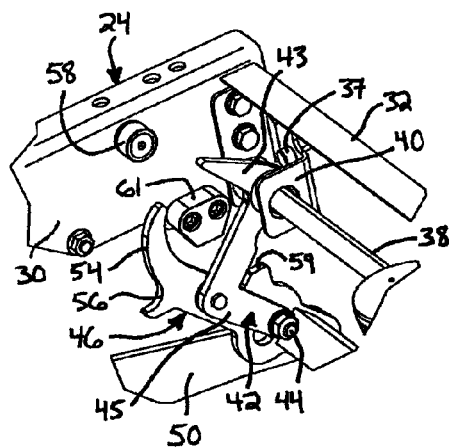
FIG. 7 is a detail view of the area defined by line 7-7 of FIG. 5.
Figure 8:
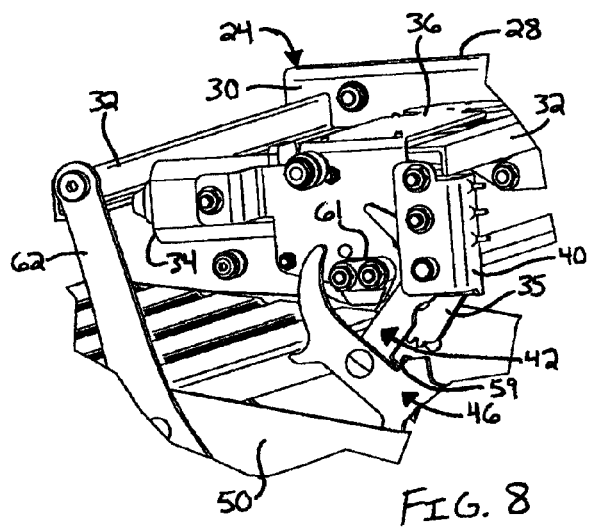
FIG. 8 a detail view of the area defined by line 8-8 of FIG. 6.

The follower link 46 is generally straight and includes an end that pivotally connects to the rear end of an arm 50 of the upper step 18. The follower link 46 includes a slot 52 between the points that pivotally connect to the drive link 42 and the upper step 18, respectively, to accommodate the pin 44 of the drive link 42. As best shown in FIG. 7, the follower link 46 also includes a guide surface 54 and a locking surface 56 at a free end. As shown in FIG. 3, the locking surface 56 accommodates a first stop 58 located on one of the mounting brackets 24 and 26. The first stop 58 may be cylindrical stop that is pivotally connected to one of the mounting brackets 24 and 26. The follower link 46 also includes a stop surface 59 (FIG. 7-8) proximate the slot 52 that engages a second stop 61 connected to one of the mounting brackets 24 and 26. The interaction of these components will be discussed further below. In addition, the follower links 46 are preferably connected by a connecting member 60.

Figure 13:
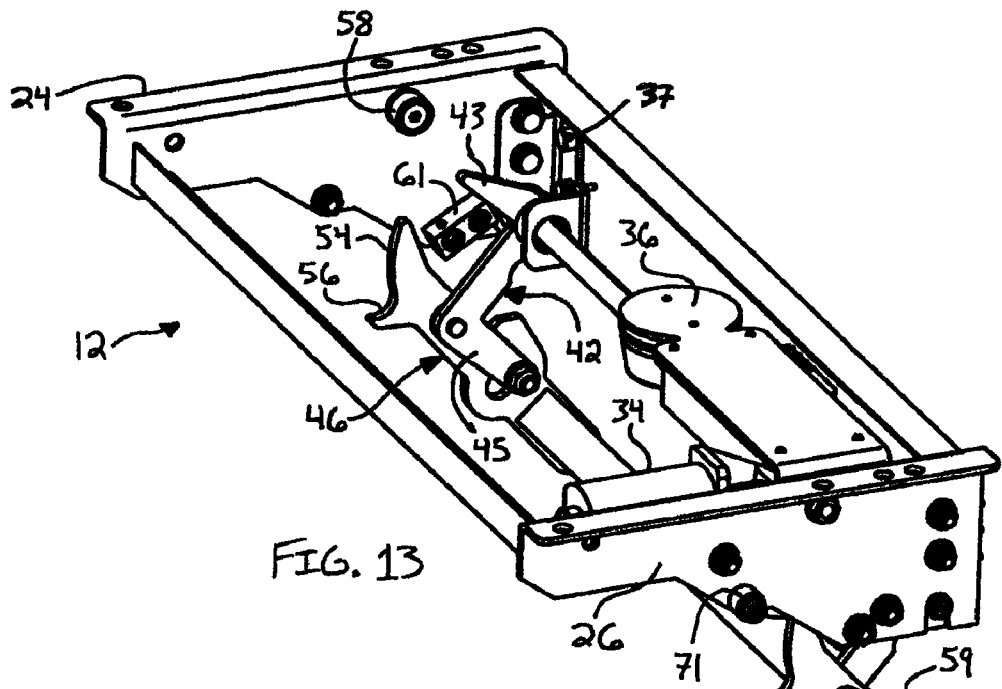
FIG. 13 is a perspective view of an alternative embodiment of the movable step apparatus moving between the extended and retracted positions with the steps removed.
Figure 14:
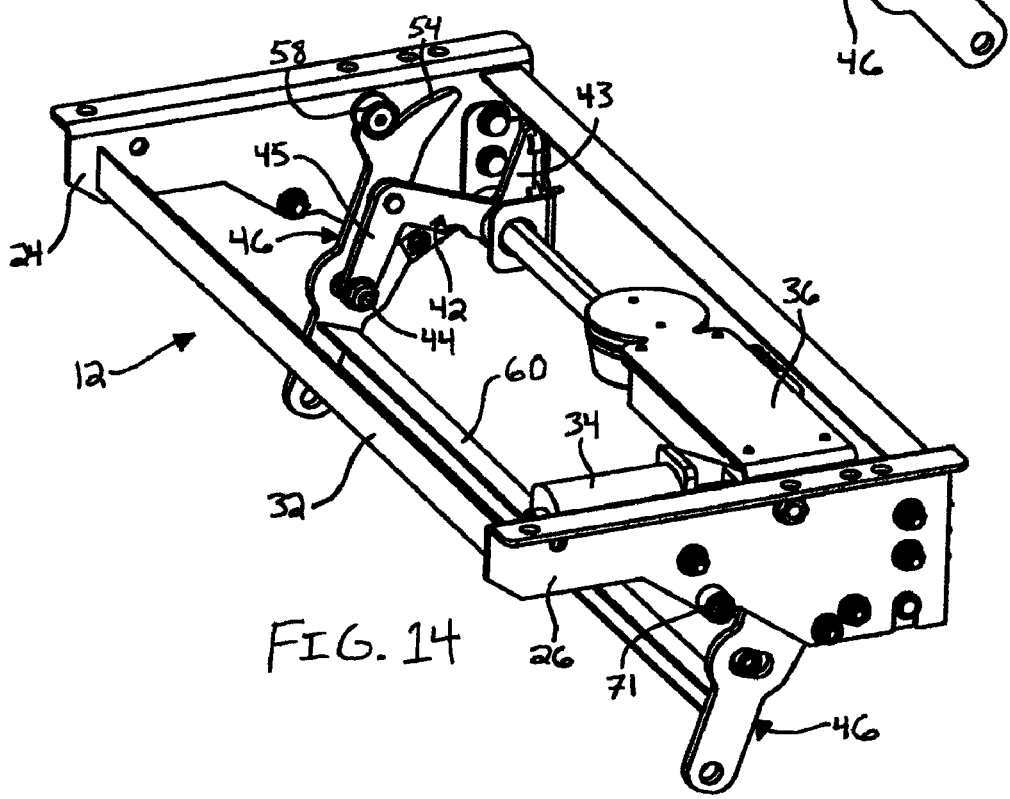
FIG. 14 is a perspective view of the embodiment of the movable step apparatus of FIG. 13 in the extended position with the steps removed.

Referring to FIGS. 1 and 2, the linkage assembly also includes a first link 62 that pivotally connects to the mounting bracket 24 at an end opposite the bracket 40 that supports the drive shaft 38. The first link 62 preferably has a dog-legged shape and has a second end that pivotally connects to the rear end of an arm 64 of the middle step 20. The first link 62 also preferably pivotally connects at a position between the ends of the first link 62 to one of the arms 50 of the upper step 18. The first link 62 preferably connects to the upper step 18 at a position between the front and rear ends of one of the arms 50 of the upper step 18, for example, near the rear end of a stepping platform 68 of the upper step 18. The first link 62 preferably contacts a stop 71 on the mounting bracket 24 in the retracted position. The stops 71 may be connected to the mounting brackets by standard fasteners as shown in FIGS. 13-14.

Referring again to FIGS. 1 and 2, the linkage assembly also includes a second link 72 that has an end that pivotally connects to a front end of the arm 50 of the upper step 18. The opposite end of the second link 72 pivotally connects to the rear end of an arm 74 of the lower step 22. The second link 72 is a generally straight member that pivotally connects at a position between the aforementioned ends to one of the arms 64 of the middle step 20. The second link 72 preferably connects to the middle step 20 at a position between the front and rear ends of one of the arms 64 of the middle step 20, for example, near the rear end of a stepping platform 76 of the middle step 20.

Still referring to FIGS. 1 and 2, the linkage assembly also includes a third link 78 that has an end that pivotally connects to a front end of the arm 64 of the middle step 20. The third link 78 is a generally straight member that pivotally connects at a second end to one of the arms 74 of the lower step 22. Specifically, the third link 78 preferably connects to the lower step 22 at a position between the front and rear ends of one of the arms 74 of the lower step 22. In addition, the rear end of a stepping platform 80 of the lower step 22 is preferably near this position.

The stepping platforms 68, 76, and 80 of the steps are preferably connected to the arms 50, 64, and 74, respectively, by standard fasteners (not shown). These fasteners are preferably covered by nylon plugs (not shown). The steps 18, 20, and 22 of the movable step apparatus 10 may be identical to reduce the number of types of components in the assembly. As such, any end of the arms that does not connect to a link 62, 72, or 78 may also include a nylon plug. In addition, those skilled in the art will recognize that additional steps may be added to the apparatus 10 by using additional second links 72. Those skilled in the art will also recognize that steps may be removed while using other advantageous aspects of the invention. However, the steps 18, 20, and 22 shown in FIGS. 1-12 should be adequate considering the size of most recreational vehicles.

The links 62, 72, and 78 and the steps 18, 20, and 22 are preferably designed such that the apparatus 10 has two parallelogram four-bar linkage structures. This ensures that the steps 18, 20, and 22 remain substantially parallel to one another throughout their range of motion. In addition, the steps 18, 20, and 22 are preferably horizontal to the upper sections 28 of the mounting brackets in the extended and retracted positions.

The drive motor 34 may be electrically connected to a controller (not shown) and a current sensor (not shown). As such, the current sensor may send a signal to the controller based on sudden current increases in the drive motor 34. The controller may stop supplying power to the drive motor 34 when such a signal is received from the current sensor. Such a current increase would occur when the stops 58 and 61, and 71 are contacted in the extended and retracted positions, respectively.

The connection between the drive link 42 and the follower link 46 will now be discussed in further detail. Referring to FIGS. 3 and 7, the drive link 42 and the follower link 46 are permitted to pivot relative to one another to a limited extent as the movable step apparatus 10 moves from the retracted position to the extended position. Specifically, the drive link 42 and the follower link 46 are permitted to pivot relative to one another about their common pivot connection to the extent permitted by the pin 44 on the drive link 42 and the slot 52 on the follower link 46. This permits the stop 58 to cam against the guide surface 54 before the apparatus 10 reaches the extended position. The engagement of the stop 58 against the guide surface 54 advantageously provides motion of the steps 18, 20, and 22 from the retracted position to the extended position as discussed below.

Figure 10:
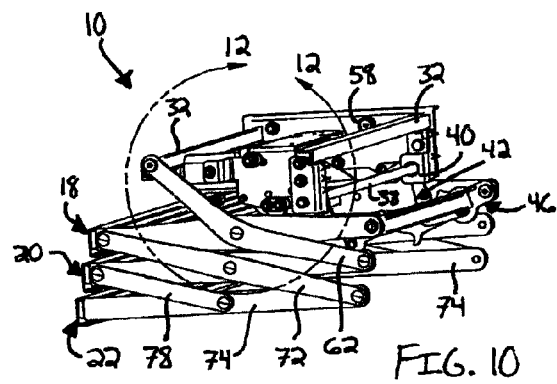
FIG. 10 is a perspective view of the movable step apparatus of FIG. 1 in the retracted position with a mounting bracket removed to illustrate the drive link and the follower link.
Figures 11, 12:
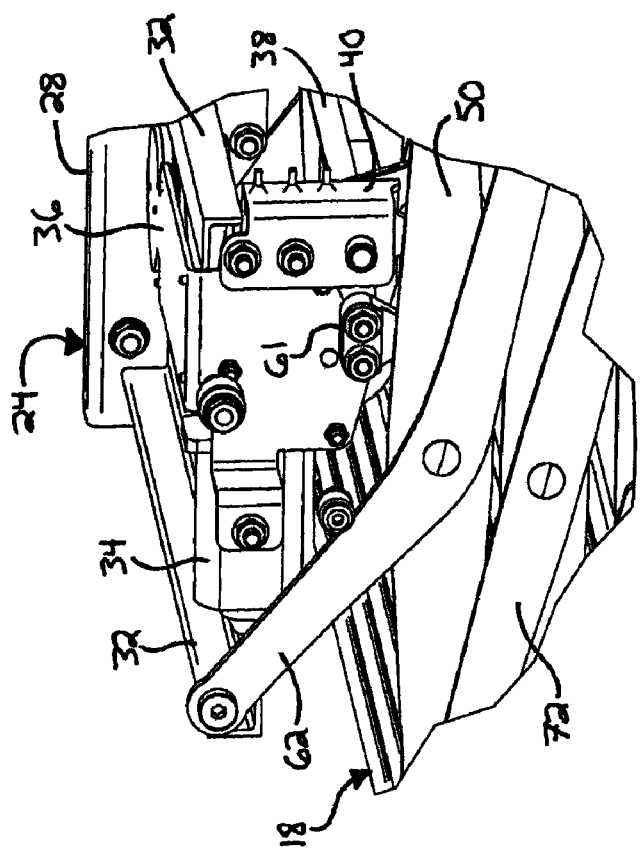
FIG. 11 is a detail view of the area defined by line 11-11 of FIG. 9.
FIG. 12 is a detail view of the area defined by line 12-12 of FIG. 10.

The steps 18, 20, and 22 are first moved from the retracted position (FIGS. 9-12) by powering the drive motor 34 to rotate the drive shaft 38 in the clockwise direction as viewed in FIG. 10. The steps 18, 20, and 22 thereafter move toward the extended position (FIG. 1-4) and, as discussed above, may remain substantially parallel to one another throughout their range of motion. When approaching the extended position, the proximal leg 43 of the drive link 42 preferably compresses the soft stops 37 to slow the drive motor 34 and the linkage assembly. Next, the first stop 58 cams against the guide surface 54 to guide the linkage assembly to the extended position. Finally, the first and second stops 58 and 61 preferably contact the locking surface 56 and the stop surface 59, respectively, at the same instant. Engagement of the first and second stops 58 and 61 with their respective surfaces stops the linkage assembly and the drive motor 34.

With the linkage assembly constructed as described above, loads applied to the steps 18, 20, and 22 can be resisted without any forces being transmitted through the drive link 42 to the drive motor 34. That is, the stops 58 and 61 resist loads applied to any or all of the steps 18, 20, and 22 while positively locking the follower link 46 and the steps 18, 20, and 22 in the extended position, and the linkage assembly cannot back-drive the drive motor 34 in the extended position. Further still, the drive shaft 38 is not deflected in the extended position. However, the pin 44 preferably does not contact the sides of the slot 52 when the steps 18, 20, and 22 are in the extended position. Such contact may cause the drive link 42, the follower link 46, or other components to bend.

In addition, the drive links 42 and the follower links 46 also lock the apparatus in the retracted position (FIG. 9-12). The rear ends of the arms 50 of the upper step 18 have a tendency to rotate upwards due to the weight of the steps 18, 20, and 22 in the retracted position. However, the pin 44 of the drive link 42 prevents this motion by contacting the bottom of the slot 52 of the follower link 46. The drive link 42 has a tendency to rotate in a counter-clockwise direction (as viewed from the drive mechanism 14) due to the force applied to the pin 44. This tendency would move the apparatus past the retracted position, which is resisted by the stops 71 on the mounting brackets 24 and 26.

Those skilled in art will recognize modifications to the present invention that are considered to be within the scope of the invention. For example, the shape of the second stop 61 may vary. The second stop 61 may have a generally trapezoidal shape (FIGS. 7-8), a generally rectangular shape (FIGS. 13-14), or other shapes. The shapes of other components may also be modified and continue to provide the advantages discussed above. As another example, the drive motor 34 may be substituted with other well known drive mechanisms, or may be connected to another well known type of transmission, such as worm gear drives and helical gear drives. Further still, most of the components of the apparatus 10 are preferably steel, but alternatively may be aluminum, plastic or a composite material.

It is specifically intended that the present invention not be limited to the embodiments and illustrations contained herein, but include modified forms of those embodiments including portions of the embodiments and combinations of elements of different embodiments as come within the scope of the following claims.

I claim:

1. A movable step apparatus, comprising:
   a mounting frame;
   at least a first step;
   a rotary drive mechanism;
   a drive link driven by the rotary drive mechanism;
   a follower link pivotally connected to the first step;
   a pin-in-slot connection defined by the drive link and the follower link, one of the follower link and the drive link having a slot of the pin-in-slot connection, the slot being elongated in a plane in a direction of motion of the one of the follower link and the drive link, and the other of the follower link and the drive link supporting a pin of the pin-in-slot connection, the pin being received in the slot and translatable within the slot in the plane in the direction of motion of the one of the follower link and the drive link;
   a second pin pivotally connecting the drive link and the follower link;
   at least one link pivotally connecting the first step to the mounting frame to permit the first step to move between a retracted and an extended position; and
   wherein the drive link drives the first step through the pin-in-slot connection and the follower link to extend and retract the first step.

2. The movable step apparatus of claim 1, wherein the slot provides stops to rotation of the other of the follower link and the drive link relative to the one of the follower link and the drive link.

3. The movable step apparatus of claim 2, wherein the slot is defined by the follower link and is disposed between an end of the follower link that is pivotally connected to a rearward portion of the first step and a free end of the follower link.

4. The movable step apparatus of claim 3, wherein the free end of the follower link has a guide surface and a locking surface and the mounting frame has a first stop that engages against the guide surface as the first step approaches the extended position and comes to rest received on the locking surface in the extended position.

5. The movable step apparatus of claim 4, wherein the follower link has a stop surface proximate the slot and the mounting frame has a second stop that engages the stop surface in the extended position.

6. The movable step apparatus of claim 5, wherein the drive link has a double dog-legged shape including a base, a proximal leg connected to a first end of the base, and a distal leg connected to a second end of the base.

7. The movable step apparatus of claim 6, wherein the mounting frame further includes a compressible stop, and the proximal leg engages the compressible stop as the first step approaches the extended position.

8. The movable step apparatus of claim 1, wherein the drive link has a double dog-legged shape including a base, a proximal leg connected to a first end of the base, and a distal leg connected to a second end of the base.

9. The movable step apparatus of claim 1, further comprising a square drive shaft that connects to the rotary drive mechanism and the drive link.

10. The movable step apparatus of claim 1, wherein the rotary drive mechanism includes a drive motor and a section gear that connects the drive shaft and the drive motor.

11. The movable step apparatus of claim 1, further comprising at least three steps including the first step.

12. A movable step apparatus, comprising:
- a mounting frame including a cylindrical stop that is pivotally connected to the mounting frame;
- at least a first step;
- a drive motor;
- a drive link rotated by the drive motor to move the first step between retracted and extended positions;
- a follower link pivotally connected to the drive link and pivotally connected to a rear end of the first step, and the follower link including a free end with a guide surface that disengages the cylindrical stop in the retracted position and engages the cylindrical stop as the first step approaches the extended position;
- at least one link pivotally connecting the first step to the frame to permit the first step to move between the retracted and extended positions; and
- wherein the follower link drives the rear end of the first step so as to extend and retract the first step.

13. The movable step apparatus of claim 12, wherein the follower link has a slot that provides stops to rotation of the drive link relative to the follower link.

14. The movable step apparatus of claim 13, wherein the drive link has a pin that extends into the slot of the follower link.

15. The movable step apparatus of claim 14, wherein the mounting frame further includes a compressible stop, and the drive link engages the compressible stop as the first step approaches the extended position.

16. The movable step apparatus of claim 15, further comprising a second stop connected to the mounting frame, and wherein the follower link further includes a stop surface that engages the second stop in the extended position.

17. The movable step apparatus of claim 12, wherein the mounting frame further includes a compressible stop, and the drive link engages the compressible stop as the first step approaches the extended position.

18. The movable step apparatus of claim 12, further comprising a second stop connected to the mounting frame, and wherein the follower link further includes a stop surface that engages the second stop in the extended position.

19. The movable step apparatus of claim 12, wherein the free end of the follower link includes a locking surface proximate the guide surface that engages the cylindrical stop in the extended position.

20. A movable step apparatus, comprising:
- a mounting frame including a cylindrical stop pivotally connected to the mounting frame;
- at least a first step;
- a rotary drive mechanism;
- a drive link driven by the rotary drive mechanism;
- a follower link pivotally connected to and driven by the drive link and pivotally connected to the first step, the follower link including a free end with a convex guide surface and an adjacent concave locking surface;
- at least one link pivotally connecting the first step to the mounting frame to permit the first step to move between the retracted and extended positions; and
- wherein the drive link drives the first step through the follower link to extend and retract the first step, and wherein the convex guide surface of the follower link engages the cylindrical stop as the first step approaches the extended position and the concave locking surface engages the cylindrical stop in the extended position.

* * * * *